J. KEITH.
HEATING, COOLING, AND VENTILATING APPARATUS.
APPLICATION FILED MAY 22, 1909.
951,250.
Patented Mar. 8, 1910.
2 SHEETS—SHEET 1.
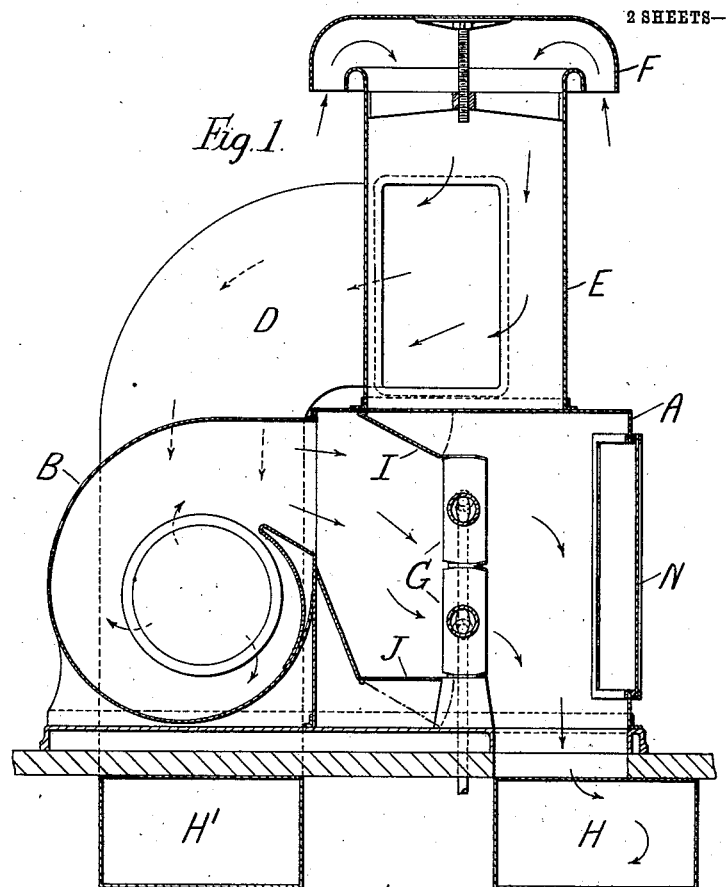
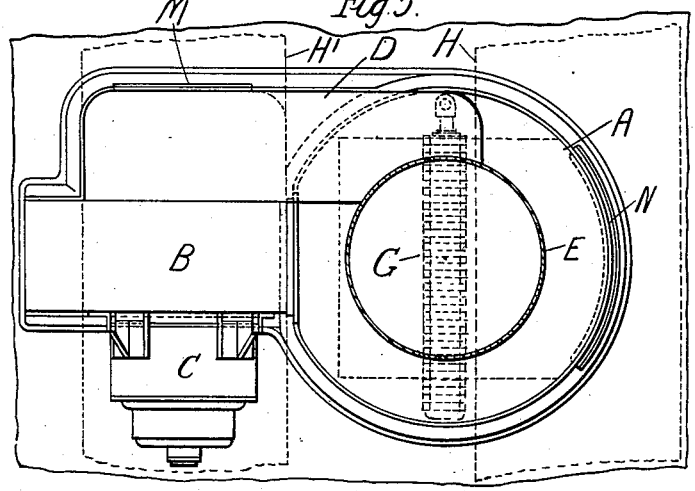
WITNESSES:
INVENTOR
JAMES KEITH,
by
Attorney.

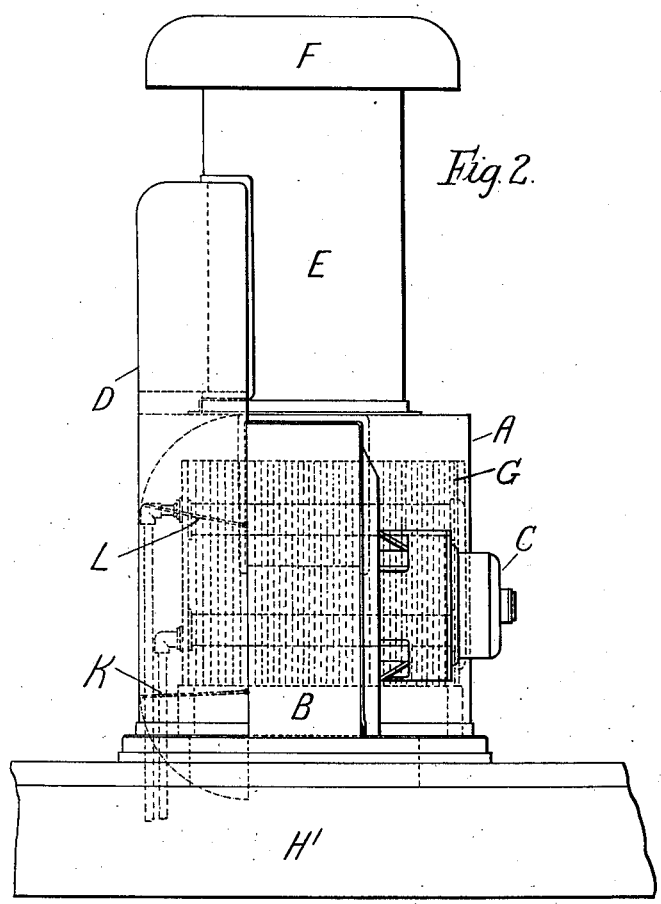

UNITED STATES PATENT OFFICE.

JAMES KEITH, OF LONDON, ENGLAND.

HEATING, COOLING, AND VENTILATING APPARATUS.

951,250.  Specification of Letters Patent.  Patented Mar. 8, 1910.

Application filed May 22, 1909. Serial No. 497,724.

*To all whom it may concern:*

Be it known that I, JAMES KEITH, a subject of the King of the United Kingdom of Great Britain and Ireland, and residing at London, England, have invented a certain new and useful Improvement in Heating, Cooling, and Ventilating Apparatus, of which the following is a specification.

This invention relates to heating, cooling and ventilating apparatus, used mainly on shipboard, in which a fan or blower is employed to force or circulate air through a heating or cooling element or elements within a casing and to direct it through air trunks or passages into the cabins or apartments to be heated, cooled or ventilated.

The novelty consists in the hereinafter described arrangement or combination of the various parts designed to secure greater efficiency of such apparatus.

In the accompanying drawings which illustrate the invention Figure 1 is a vertical section of the apparatus as applied for heating or cooling and delivering or circulating air to or in an air trunk system connected to the cabins of a ship; Fig. 2 is an end elevation; and Fig. 3 is a sectional plan of the same.

As shown, the apparatus comprises a casing A of usual form to which is connected the case B of a fan or blower preferably of the low pressure and large volume type suitably driven by an electro-motor C, the inlet eye of the fan case being connected by a pipe or trunk D to a deck ventilator E having the usual screw down mushroom cover F. Within the casing A is fitted a heat-transferring element G of the form shown which extends over the greater part of the depth and across the width of the casing so that the air drawn in by the fan through the ventilator inlet is blown through the spaces between the "fins" of the heating or cooling element on which it impinges and is thereby heated or cooled on its passage to the branch H of the air trunk system as indicated by arrows in Fig. 1.

In order that the temperature of the flowing air may be varied if desired without great variation of the temperature of the heating or cooling element, flap doors or valves I and J which normally serve to direct the air draft on to the heating or cooling element are provided and so hinged to the casing A that they may be swung or more or less opened to permit of the flow of a portion of the air through passages above and below the element, the volume of the air delivered being thus increased or the temperature correspondingly modified. The valves I and J may be operated independently or may be coupled to work in unison by a lever located outside the casing.

To provide for circulation of heated or cooled air through the cabins during stormy weather when the mushroom top of the ventilator is screwed down, a return trunk $H^1$ is connected to the inlet air pipe D or forms an extension of the latter. A hinged valve K serves normally to cut off the trunk $H^1$ when fresh air is drawn in from the ventilator E, but when the ventilator E is closed the valve K is opened and an upper valve L may be closed so that the fan draws air from the trunk $H^1$ and directs it through the casing A to the trunk H, the air being heated or cooled in its passage by the element G.

Access to the fan is provided by a door M in the air inlet pipe, and access to the interior of the casing A is obtained through a door N in the end of the latter.

Having now described my invention what I claim and desire to secure by Letters Patent of the United States is:—

In heating, cooling and ventilating apparatus, in combination, a casing, a door for said casing, a fan case having an inlet eye, said case directly connected to said casing, a centrifugal fan adapted to rotate within the fan case, a ventilator, a screw-down cover for said ventilator, a pipe connecting the inlet eye of said fan case with said ventilator, a door in said pipe, an air trunk system connected to said casing, a tubular heat transferring element fitted in said casing, located between the fan case and the air trunk system, two valve flaps fitted in said casing, one above and one below said element, said flaps serving when closed to direct the flow of air through said element and serving when open to permit flow of air past said element, a return trunk connected to said pipe, a valve serving to cut off the return trunk from the casing when air is drawn in from the ventilator and to permit the flow of air from the return trunk to the casing when the ventilator is closed, and a valve for cutting off communication between the ventilator and the casing.

In testimony whereof I have signed my name to this specification in the presence of two subscribing witnesses.

JAMES KEITH.

Witnesses:
 WALLACE CRANSTON FAIRWEATHER,
 JOHN MCCLEARY, Jr.